United States Patent [19]

Kathiresan et al.

[11] Patent Number: 4,896,940
[45] Date of Patent: Jan. 30, 1990

[54] OPTICAL FIBER CABLE FOR USE IN HIGH TEMPERATURE CONTAMINATING ENVIRONMENT

[75] Inventors: Krishnaswamy Kathiresan, Marietta; Parbhubhai D. Patel, Dunwoody; Manuel R. Santana, Doraville, all of Ga.

[73] Assignee: American Telephone and Telegraph Company, AT&T Bell Laboratories, Murray Hill, N.J.

[21] Appl. No.: 309,897

[22] Filed: Feb. 10, 1989

Related U.S. Application Data

[63] Continuation of Ser. No. 90,075, Aug. 27, 1987, abandoned.

[51] Int. Cl.⁴ .............................................. G02B 6/44
[52] U.S. Cl. .................................................. 350/96.23
[58] Field of Search ...................................... 350/96.23

[56] References Cited

U.S. PATENT DOCUMENTS

| | | | |
|---|---|---|---|
| 2,009,004 | 7/1935 | Schatzel | 173/264 |
| 4,150,249 | 4/1979 | Pedersen | 174/36 |
| 4,151,366 | 4/1979 | Betts et al. | 174/116 |
| 4,154,976 | 5/1979 | Brorein | 174/115 |
| 4,232,935 | 11/1980 | Rohner | 350/96.23 |
| 4,284,842 | 8/1981 | Arroyo et al. | 174/707 |
| 4,373,608 | 2/1983 | Anderson | 350/96.23 |

FOREIGN PATENT DOCUMENTS

| | | |
|---|---|---|
| 1125554 | 6/1982 | Canada . |
| 0158433 | 10/1985 | European Pat. Off. . |
| 0255848 | 2/1988 | Fed. Rep. of Germany . |
| WO85/00689 | 2/1985 | PCT Int'l Appl. . |
| 1438074 | 6/1976 | United Kingdom . |
| 2138168 | 10/1984 | United Kingdom . |
| 2145556 | 3/1985 | United Kingdom . |

OTHER PUBLICATIONS

Bentley Harris catalogs.
CHR Industries catalog.

*Primary Examiner*—William L. Sikes
*Assistant Examiner*—Robert E. Wise
*Attorney, Agent, or Firm*—E. W. Somers

[57] ABSTRACT

An optical fiber cable (20) which may be used in a high temperature environment for a substantial period of time without degradation of transmission includes an optical fiber core (22) which is enclosed by an inner tubular member (32) having suitable temperature resistant properties. A braided metallic outer tubular member (50) encloses the inner tubular member and provides suitable mechanical protection and strength for the cable. The integrity of the cable and its performance is further enhanced by a corrugated metallic tube having a sealed periphery and being interposed between the inner and outer tubular members to prevent the ingress of liquid contaminants and to provide the cable with flexibility.

13 Claims, 2 Drawing Sheets

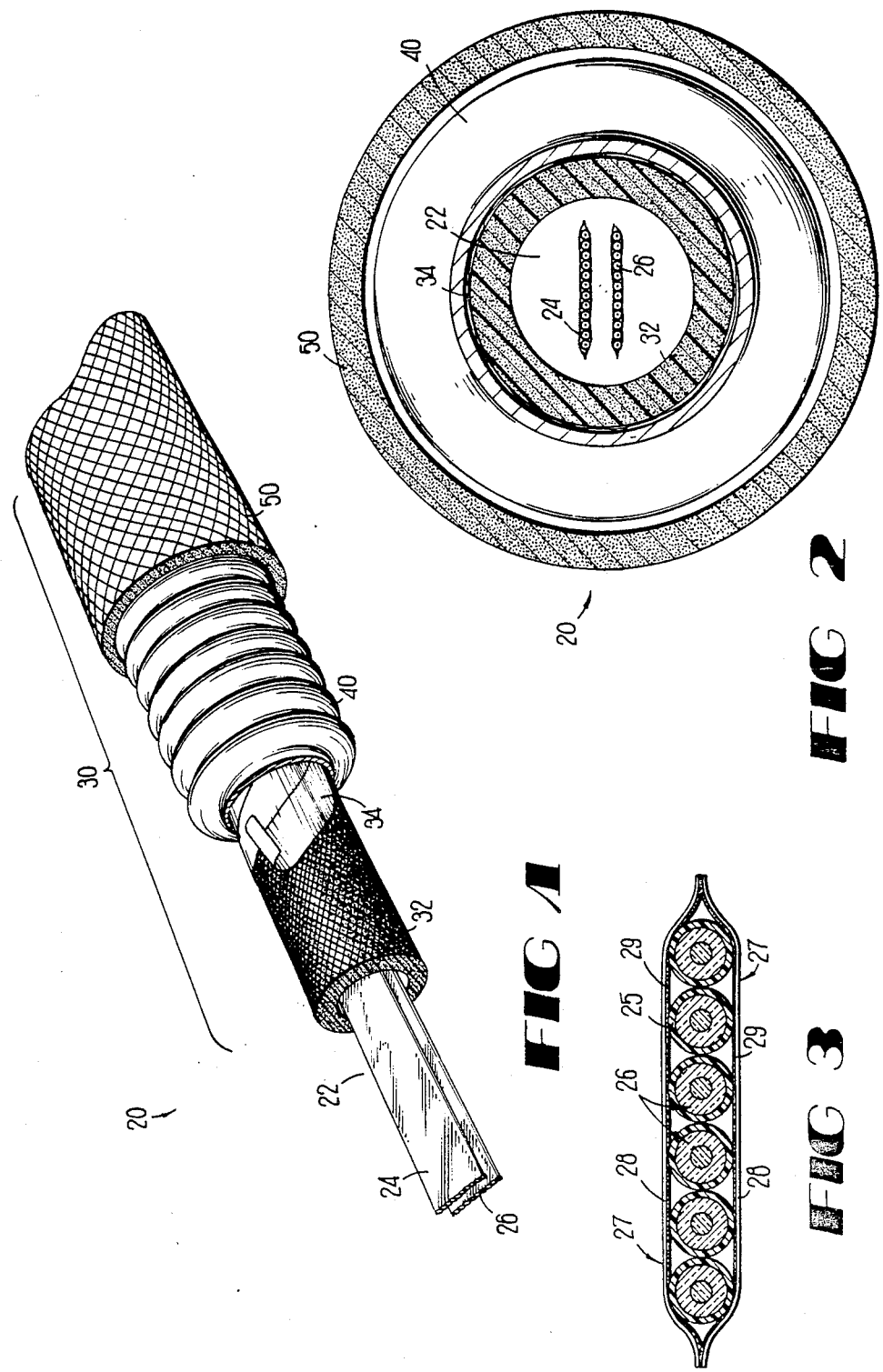

OPTICAL FIBER CABLE FOR USE IN HIGH TEMPERATURE CONTAMINATING ENVIRONMENT

This application is a continuation of application Ser. No. 07/090,075, filed on 8/27/87, now abandoned.

TECHNICAL FIELD

This invention relates to an optical fiber cable for use in high temperature, contaminating environments. More particularly, this invention relates to an optical fiber cable which may be used without transmission degradation in a contaminating environment of a relatively high temperature and which has sufficient strength and flexibility to facilitate its installation.

BACKGROUND OF THE INVENTION

Optical fibers are in widespread use today as transmission media because of their large bandwidth capabilities and small size. However, they are mechanically fragile, exhibiting low strain fracture under tensile loading and degraded light transmission when bent. Also, an optical fiber cable must be capable of withstanding tensile loads applied when the cable is routed along runs and bending stresses caused when the cable is pulled through turns. Accordingly, cable structures have been developed to protect mechanically the optical fibers thereby rendering them a realizeable transmission medium. Tensile strength for optical fiber cables has been provided by helically wrapped metallic wires for large fiber count cables and by high strength yarn such as Kevlar ® or glass yarn, for example, for those having a relatively small fiber count.

As the use of optical fiber has grown, so too have the requirements which must be met for its use in special situations. In those special situations, tensile strength may or may not be a requirement, but other properties must be achieved.

For example, in the construction of many buildings, a finished ceiling, which is referred to as a drop ceiling, is spaced below a structural floor panel that is constructed of concrete. The space between the ceiling and the structural floor from which it is suspended serves as a return-air plenum for elements of heating and cooling systems as well as a convenient location for the installation of communications cables including those for computers and alarm systems. It is not uncommon for these plenums to be continuous throughout the length and width of each floor.

When a fire occurs in an area between a floor and a drop ceiling, it may be contained by walls and other building elements which enclose that area. However, if and when the fire reaches the plenum, and if flammable material occupies the plenum, the fire can spread quickly throughout an entire story of the building. The fire could travel along the length of cables which are installed in the plenum. Also, smoke can be conveyed through the plenum to adjacent areas and to other stories.

Generally, a non-plenum cable sheath system which encloses a core of insulated copper conductors and which comprises only a conventional plastic jacket does not possess acceptable flame spread and smoke evolution properties. As the temperature in such a cable rises, charring of the jacket material begins. Afterwards, conductor insulation inside the jacket begins to decompose and char. If the jacket char retains its integrity, it functions to insulate the core; if not, it is ruptured by the expanding insulation char, exposing the virgin interior of the jacket and insulation to elevated temperatures. The jacket and the insulation begin to pyrolize and emit flammable gases. These gases ignite and, because of air drafts within the plenum, burn beyond the area of flame impingement, propagating flame and evolving smoke.

The prior art has addressed the problem of cable jackets that contribute to flame spread and smoke evolution through the use of special materials, such as fluoropolymers, for example. These, together with enclosing layers of other materials, have been used to control char development, jacket integrity and air permeability to minimize restrictions on choices of materials for insulation within the core. One prior art small size plenum cable is disclosed in U.S. Pat. No. 4,284,842 which was issued on Aug. 18, 1981, in the names of C.J. Arroyo, et al. That cable includes a polyvinyl chloride insulated metallic conductor core which is enclosed in a corrugated metallic shield and helically wrapped tape comprised of Kapton ® polyimide film.

The problem of acceptable plenum cable design is complicated somewhat by the trend to the extension of the use of optical fiber transmission media from a loop to building distribution systems. Not only must the optical fibers be protected from transmission degradation, but also they have properties which differ significantly from those of copper conductors and hence require special treatment. As mentioned earlier, transmitting optical fibers are mechanically fragile, exhibiting low strain fracture under tensile loading and degraded light transmission when bent. The degradation in transmission which results from bending is known as macrobending loss. Another mechanism which causes degradation of transmission is known as microbending loss. This loss can occur because of shrinkage during cooling of the jacket and because of differential thermal contractions when the thermal properties of the jacket material differ significantly from those of the enclosed optical fibers.

Cables for these special applications often must meet requirements established by industry watchdog organizations or government regulatory agencies. For example, in order to be acceptable for use in a plenum, a cable must meet the requirements of Underwriters Laboratories test 910.

Other uses of optical fibers for communications continue to surface. For example, it is expected that optical fiber wiring harnesses will be used in jet aircraft or in nuclear installations where they also will be subject to scrutiny of watchdog organizations or of government regulatory agencies.

For such use in aircraft, the optical fiber cable must not only have a specified tensile strength to enable pulling throughout the aircraft frame, but also it must have other properties. For use in jet aircraft, for example, the sought-after cable must be able to function for a relatively long period of time in temperatures in the range of 500° F. Also, once a conflagration begins, aircraft operators require a specified time within which to make a decision as to a course of action. A candidate cable must pass a flame test in which it is exposed to a temperature of 2000° F. for fifteen minutes. This latter test is used to evaluate the performance of the cable under catastrophic conditions. As should be apparent, the temperature requirements for jet aircraft use exceed those for plenum cable.

Optical fiber transmission is affected moreso than metallic conductors by high temperature levels. In copper cables, although the plastic insulation may burn, the copper conductors will continue to be operative for a specified time. At the temperature levels expected in jet aircraft, the jacket and/or coating material which encloses the optical fiber will degrade. Inasmuch as the optical fiber itself cannot withstand the expected tensile loading, microcracks will develop unless the optical fiber is provided with suitable protection.

Nevertheless, there is great impetus for using optical fiber instead of copper conductors in presently manufactured aircraft. This desire is driven by the advantages which optical fiber enjoys over copper conductors. For example, optical fiber conductors are immune from electromagnetic interference, have a higher bandwidth than metallic conductors and are of a smaller size and lower weight while being more reliable.

Additionally, to qualify for use in jet aircraft, the sought-after cable must be sealed hermetically. This is required in order to prevent the ingress of contaminants such as jet fuel, methyl ethyl ketone, salt water and hydraulic fluid, at least some of which may be at elevated temperatures.

Presently, cables for use in jet aircraft and other high temperature applications include copper conductors insulated and or jacketed with high temperature resistant plastic materials such as Teflon plastic, for example. In those cables, there is not the same level of concern about the copper conductors as there is about the optical fibers in an optical fiber cable used in the same environment. Should the plastic be dissolved by contaminating fluids, the metallic conductors most likely continue to provide for transmission. To the contrary, in an optical fiber cable, once the protective jacket and coating are removed from the cable, the optical fibers are susceptible to attack and transmission loss ensues.

Furthermore, the sought-after cable must be flexible so that it can be routed along tortuous paths in jet aircraft or in other confined spaces. Of course, as is well known, cables of the prior art have included corrugated shields which have provided flexibility, particularly for large pair count metallic conductor cables.

One need not dwell too long to arrive at other uses for hermetically protected, high temperature resistant cables. What is sought is a sheath protection system which may be used for a number of different cables. It must be one which is hermetically sealed, which will withstand a grossly elevated temperature for a predetermined time and which will be operative for a predetermined time should a catastrophe occur. The sought-after cable must have a relatively small diameter and requisite tensile strength. Also, it must be flexible and be relatively inexpensive to manufacture. Seemingly, the prior art does not include a cable which possesses all the aforementioned properties.

SUMMARY OF THE INVENTION

The foregoing problems of the prior art have been overcome by a cable of this invention. The cable of this invention includes a core comprising at least one optical fiber transmission medium. An inner tubular member which is made of a high temperature resistant material encloses the core. The inner tubular member is enclosed by an intermediate tubular member which provides a sealed enclosure for preventing the ingress of liquid contaminants and which provides flexibility for the completed cable. An outer tubular member surrounds the intermediate tubular member and is capable of preserving the integrity of the cable notwithstanding its exposure to an elevated temperature for a prolonged period of time and is capable of preventing the transfer of excessive tensile forces which are applied to the cable to the cable core.

In a preferred embodiment, the inner tubular member includes a woven fabric of a heat resistant material in which are disposed loosely one or more optical fibers and may be referred to as a core tube. The core could just as well include optical fiber ribbons in which optical fibers may be sandwiched between two tapes, or bonded with a suitable material. Each of the optical fibers in enclosed in a polyimide coating. If a ribbon arrangement is used, the coated optical fibers are held between two polyimide tapes, for example. The core tube which may or may not be covered with a core wrap material for additional thermal protection is disposed within a corrugated metallic tube which has a closed seam and which is made of stainless steel. The corrugated metallic tube provides a hermetic seal in a longitudinal direction along the cable length. Outer protection and tensile strength are provided by a braided tube which preferably also is made of stainless steel.

BRIEF DESCRIPTION OF THE DRAWING

Other objects and features of the present invention will be more readily understood from the following detailed description of specific embodiments thereof when read in conjunction with the accompanying drawings, in which:

FIG. 1 is a perspective view of an optical fiber cable of this invention;

FIG. 2 is an end cross-sectional view of the cable of FIG. 1;

FIG. 3 is an enlarged view of an optical fiber ribbon which may be included in the core of the cable of FIG. 1;

DETAILED DESCRIPTION

Figure 5:
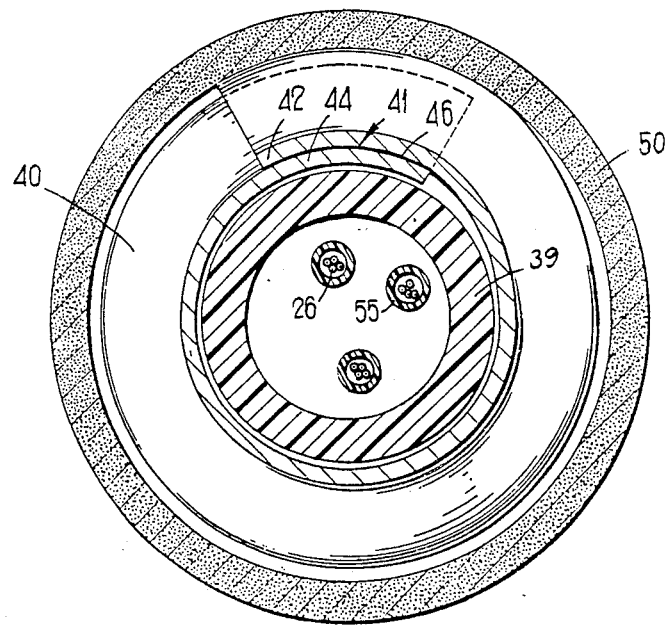
FIG. 5 is an end cross-sectional view of still another embodiment of this invention.

Referring now to FIGS. 1 and 2, there is shown a cable which is designated generally by the numeral 20. The cable 20 which includes an optical fiber core 22 is especially suited to be used in relatively high temperature environments for prolonged periods of time. As is seen, the optical fiber core 22 includes a plurality of ribbons each being designated by the numeral 24 and each comprising a plurality of optical fibers 26—26.

In order to optimize the thermal protection, each of the optical fibers 26—26 is provided with a polyimide coating 25 (see FIG. 3) having an outer diameter of about 145 microns. Further, each of the ribbons 24—24 is made in a manner to enhance the thermal resistance of the cable 20. For example, a plurality of the optical fibers 26—26 are enclosed between two tapes, each of which is a laminate 27 (see FIG. 3) comprising a polyimide layer 28 such as Kapton ® polyimide and a layer 29 of a special high temperature resistant adhesive material which is contiguous to the optical fibers. Such a laminate is available from CHR Industries, Inc. of New Haven, Conn. under the trademark designation Temp-R-Tape ®.

Figure 4:
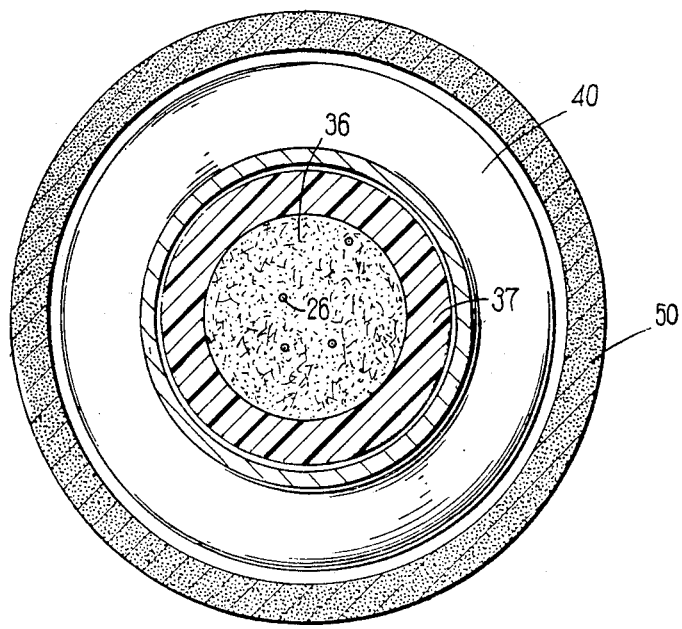
FIG. 4 is an end cross-sectional view of another embodiment of this invention.

It should be apparent that the core 22 is not limited to a ribbon or a plurality of ribbons. For example, the core 22 may include a plurality of optical fibers 26—26 (see FIGS. 4 and 5) in a stranded or non-stranded configuration.

In order for the cable 20 to be capable of being used in high temperature contaminating environments, the cable includes a sheath system designated generally by the numeral 30. An innermost element of the sheath system 30 is an inner tubular member 32. In a preferred embodiment, the inner tubular member 32 comprises a woven material which is made of a high temperature resistant material. Such a material may be one such as ST heat treated fiberglass sleeving which is marketed by Bentley Harris. In another embodiment, the inner tubular member 32 may be a high temperature resistant plastic material such as silicone 37 (see FIG. 4) or Teflon plastic 39 (see FIG. 5) which has been extruded about the core. Typically, the inner tubular member has a thickness of about 0.040 inch and in inner diameter of about 0.160 inch.

Enhanced thermal and mechanical protection also may be provided for the core 22. As is shown in FIG. 1, a thermal core wrap 34 is wrapped helically about the inner tubular member 32. In a preferred embodiment, the core wrap 34 comprises a Kapton ® polyimide tape marketed by E. I. DuPont de Nemours.

Further modifications are within the scope of this invention. For example, additional fiberglass 36 (see FIG. 4) may be provided as a packing in the inner tubular member in engagement with the optical fibers. This core packing cushions the optical fibers 26—26 against vibrations and, in an additional function, causes the cable to have enhanced thermal performance at elevated temperatures.

The inner tubular member 32 is enclosed by an intermediate tubular member 40 which is effective to withstand lateral compressive loading, to provide the cable with flexibility and to seal the cable to prevent the ingress of contaminants into the core. In a preferred embodiment, the intermediate tubular member 40 comprises a corrugated metallic tube which encloses the inner tubular member 32. The corrugated metallic tube preferably is made of stainless steel which ideally is suited to resist attack by corrosive liquids that may contact the cable. Further, the corrugated tube provides a hermetic seal longitudinally of the cable 20 by causing a corrugated tape to become wrapped about the inner tubular member in a manner to provide a longitudinal sealed seam 41 (see FIG. 5). Such a seam may be provided by causing longitudinal edge portions 42 and 44 of a corrugated metallic tape to be overlapped to form the longitudinally extending seam 41 with an adhesive material disposed therebetween. In the alternative, the corrugated intermediate tubular member may be seamless. For the preferred embodiment, the corrugated intermediate tubular member has an inner diameter of about 0.250 inch and an outer diameter of about 0.454 inch.

Of course, for the cable to have an effective hermetic seal, its ends also must be sealed. This may be accomplished by special connectors or end plugs not herein shown.

Other embodiments of the intermediate tubular member 40 are contemplated by the invention. For example, for some temperature environments, a tubular metallic member having an inner surface provided with a coating of TEFLON plastic may be used to enclose the inner tubular member. Such an intermediate tubular member possesses suitable flexibility and temperature resistant properties.

Further, the sheath system 30 includes an outer tubular member or jacket 50. The outer tubular member provides the cable 20 with suitable mechanical protection and tensile strength. It must be capable of withstanding elevated temperatures for extended periods of time and must resist the corrosive impact of various contaminants to which it may be exposed. In the preferred embodiment, the outer tubular member 50 is made of a braided stainless steel material having a thickness of about 0.030 inch.

The cable 20 of this invention fills a need to provide an optical communications medium which may be exposed to relatively high temperatures for extended periods of time and simultaneously to corrosive atmospheres. For example, in one use which is envisioned, the cable may be exposed to a contaminant while being exposed to a temperature of at least 500° F. for as long as 30,000 hours. Advantageously, the cable 20 is capable of being grounded through its metallic sheath components to provide protection against lightning. The cable 20 is relatively small in diameter, and is sufficiently flexible to be routed in tortuous paths. Also, it has sufficient tensile strength to allow it to be pulled in cable runs and sufficient compressive strength to withstand expected compressive loading. Further, the braided stainless steel jacket 50 provides suitable strength for the cable without compromising its flexibility.

Still further, the cable 20 of this invention provides protection for a limited time under catastrophic conditions. For example, it remains operative notwithstanding exposure to a temperature of at least 2000° F. for at least fifteen minutes. This provides sufficient time for an aircraft pilot, for example, to make a decision which may affect the lives of many passengers.

In still another embodiment, the core 22 includes a plurality of groups of individual optical fibers. Each group of the optical fibers is provided with an individual jacket 55 (see FIG. 5) which may be a tubular member made of a woven fiberglass material or a suitable plastic material. The plurality of individually jacketed optical fiber groups is enclosed in the inner tubular member 32, 37 or 39, corrugated metallic tube 40 and the braided stainless steel jacket 50 shown in FIG. 1.

It is to be understood that the above-described arrangements are simply illustrative of the invention. Other arrangements may be devised by those skilled in the art which will embody the principles of the invention and fall within the spirit and scope thereof.

What is claimed is:

1. A communications cable which comprises:
a core which includes at least one optical transmission medium;
an inner tubular member which comprises a material that allows the transmission media at least one transmission medium to continue to be effective notwithstanding exposure of the cable to temperatures in the range of at least about 500° F. for a period of time as long as about 30,000 hours and which encloses said core;
sealing means enclosing said inner tubular member for providing a sealed enclosure therefor along the length of said cable to prevent the ingress of contaminants and for providing the cable with flexibility; and an outer tubular member which is made of a braided metallic material and which encloses said sealing means and which is capable of providing said cable with mechanical protection and tensile strength notwithstanding exposure to said temperatures for said period of time.

2. The communication cable of claim 1, wherein said inner tubular member comprises a woven fiberglass material.

3. The communications cable of claim 1, wherein said inner tubular member comprises a plastic material.

4. The communications cable of claim 1, which also includes a core wrap tape which is disposed about said inner tubular member to provide additional thermal and mechanical protection.

5. The communications cable of claim 1, wherein said means for providing a sealed enclosure for said tubular member includes a corrugated metallic tubular member.

6. The communications cable of claim 5 wherein said corrugated tubular member is made of stainless steel material.

7. The communications cable of claim 1, wherein said means for providing a sealed enclosure for said tubular member includes a tubular metallic member which is coated with a fluoropolymer plastic material and which has sufficient flexibility to allow said cable to be routed in tortuous paths.

8. The communications cable of claim 1, wherein said sealing means includes a corrugated metallic tube having a sealed longitudinal seam.

9. The communications cable of claim 9, wherein said inner tubular member is filled with a fiberglass material which provides a mechanical cushioning for the optical transmission medium core.

10. The communications cable of claim 1, wherein said core comprises a plurality of groups of optical fibers with each of said groups being enclosed in a fiberglass material.

11. The communications cable of claim 1, wherein said core comprises a plurality of optical fibers each of which is provided with a coating comprising a polyimide material.

12. The communications cable of claim 12, wherein said plurality of optical fibers are held between two tapes, each of said tapes comprising a layer of polyimide material and a layer of an adhesive material which protects said optical fibers against temperatures in the range of at least about 500° F. for said period of time.

13. A communications cable, which provides service for at least a predetermined time when exposed to relatively high temperatures and contaminants, said cable comprising:

a core which includes at least one optical transmission medium;

an inner tubular member which comprises a fiberglass material and which encloses said core;

a corrugated metallic tube which encloses said inner tubular member and which has a closed circumferential periphery, said corrugated metallic tube providing said cable with sufficient flexibility to allow said cable to be routed in tortuous paths; and an outer tubular member which comprises braided stainless steel and which encloses said corrugated metallic tube, said outer tubular member providing predetermined tensile strength for said cable, and said cable being effective to prevent the ingress of contaminants and to provide continued transmission without degradation notwithstanding exposure for as long as about 30,000 hours to a temperature of at least about 500° F. and exposure for at least fifteen minutes to a temperature of at least about 2000° F.

* * * * *

UNITED STATES PATENT AND TRADEMARK OFFICE
CERTIFICATE OF CORRECTION

PATENT NO. : 4,896,940

DATED : January 30, 1990

INVENTOR(S) : Krishnaswamy Kathiresan

It is certified that error appears in the above-identified patent and that said Letters Patent is hereby corrected as shown below:

Column 6  Line 58:  "that allows the transmission media at least one"

Should read: --that allows the at least one--

Signed and Sealed this

Thirteenth Day of October, 1992

Attest:

DOUGLAS B. COMER

Attesting Officer   Acting Commissioner of Patents and Trademarks